(12) United States Patent  (10) Patent No.: US 9,082,053 B2
Yang  (45) Date of Patent: Jul. 14, 2015

(54) CODE PATTERN COMPRISING INFORMATION DECIPHERED BY DIGITAL DEVICE AND OPERATING SYSTEM FOR SAME

(75) Inventor: Jong-Moon Yang, Seoul (KR)

(73) Assignee: Artarch & Door Works Inc., Seoul (KR)

( * ) Notice: Subject to any disclaimer, the term of this patent is extended or adjusted under 35 U.S.C. 154(b) by 0 days.

(21) Appl. No.: 14/112,015

(22) PCT Filed: May 21, 2012

(86) PCT No.: PCT/KR2012/003984
§ 371 (c)(1),
(2), (4) Date: Oct. 15, 2013

(87) PCT Pub. No.: WO2013/015516
PCT Pub. Date: Jan. 31, 2013

(65)  Prior Publication Data
US 2014/0042233 A1  Feb. 13, 2014

(30)  Foreign Application Priority Data
Jul. 26, 2011 (KR) .................... 10-2011-0074161

(51) Int. Cl.
*G06K 19/06* (2006.01)
(52) U.S. Cl.
CPC .... *G06K 19/06046* (2013.01); *G06K 19/06168* (2013.01)

(58) Field of Classification Search
USPC ........................................ 235/494
See application file for complete search history.

(56)  References Cited

U.S. PATENT DOCUMENTS

2003/0066896 A1* 4/2003 Pettersson et al. ............ 235/494
2010/0092079 A1* 4/2010 Aller ............................ 382/165

FOREIGN PATENT DOCUMENTS

| JP | 2003-317051 A | 11/2003 |
| JP | 2004-320443 A | 11/2004 |
| KR | 10-2002-0058161 A | 7/2002 |
| KR | 10-2004-0014744 A | 2/2004 |
| KR | 10-2006-0115023 A | 11/2006 |

OTHER PUBLICATIONS

International Search Report from the Korean Intellectual Property Office in corresponding International Application No. PCT/KR2012/003984, mailed Nov. 29, 2012.

* cited by examiner

*Primary Examiner* — Jamara Franklin
(74) *Attorney, Agent, or Firm* — Juan Carlos A. Marquez; Bacon & Thomas PLLC (57)  ABSTRACT

Disclosed is a design code pattern capable of utilizing the elements having a freedom degree of a design and an aesthetic value in a design side by storing information of a suitable size in consideration of characteristics where a large amount of information is not required to connect with a target server by a gateway. The coded information is expressed as the design patterns including a plurality of design individuals wherein the number and order are applied to the design individuals on the basis of sizes and shapes of the designs.

12 Claims, 9 Drawing Sheets

| MATCHING CODE VALUE | REGISTRATION INFORMATION |
|---|---|
| 00000001 | www.abc.co.kr/abc.doc |
| 00000010 | 010-1234-5678 ABC CO. LTD. |
| ... | ... |
| 00012345 | IMAGE    MOVING IMAGE |
| ... | ... |

CODE PATTERN COMPRISING INFORMATION DECIPHERED BY DIGITAL DEVICE AND OPERATING SYSTEM FOR SAME

TECHNICAL FIELD

The present invention relates to a pattern with code information, and more particularly, to a design code pattern representing information interpreted with a digital device, and an operating system thereof.

BACKGROUND ART

In general, for example, a code pattern capable of acquiring an image by means of a camera or a scanner to extract a code from the acquired image includes a maxicode, a data matrix, a code one, a soft-strip code, a QR code, a bar code, etc. Such code patterns are variously applied throughout a current industry and a real life.

Code patterns according to the related art such as a QR code or a bar code are invented for a technical purpose and have to have encrypted information in the code. Accordingly, the code patterns are created to include much information and thus have complex structures and further an important point is whether how much information may be interpreted without an error. In particular, recently, a frequently used QR code is a two dimensional code of a matrix type representing information with a black and white lattice pattern, and is advantageous to store a large amount of information such as character data as well as numbers.

However, for example, since the code patterns according to the related art easily gives denial at a religious side like a bar code, there is a need to use a code pattern as a design element by providing an aesthetic value as well as a function as a simple recognition means of information. Further, upon considering a real use side of a QR pattern having improved information storage capacitance, a path function connecting a web page over an Internet is merely performed, so the real used code pattern does not require an excessively large information storage capacity. As a result, there is a demand for a code pattern having a new form capable of providing an information storage capacity of a suitable size and increasing an aesthetic value at a design side without denial.

PRESENT INVENTION

Technical Problem

The present invention has been made in view of the above problems, and provides a design code pattern capable of giving an aesthetic value to a code pattern in a design side.

The present invention further provides a design code pattern capable of using elements having a high freedom degree of a design and an aesthetic value in a design side by storing information of a suitable size in consideration of a characteristic where a large amount of information is not required to connect with a target server by a gateway.

The present invention further provides a design code pattern and operating system thereof where information represented in the design code pattern is not damaged, even if the user optionally changes the design.

Technical Solution

In order to achieve the objects as described above, there are provided a design code pattern and an operating system thereof wherein the coded information is expressed as the design patterns including a plurality of design individuals in which the number and order are applied to the design individuals on the basis of sizes and shapes of the designs.

The design code pattern according to the present invention includes a plurality of code patterns formed in a predetermined region, having different sizes and in which identifiers are formed, respectively, wherein characters or numerical values are applied according to one of the sizes and the identifiers of the code patterns and an order of the code patterns is determined according to a remaining one of the sizes and the identifiers to express a series of coded information. Here, a reference pattern to define a recognition region in which the code patterns are formed may be formed.

The design code pattern may further include a reference pattern to define reference orientation, wherein the code patterns have a shape with orientation. Here, the identifiers may be determined according to orientation differences of the code patterns with respect to the reference orientation. In special, different characters or numerical values may be applied according to the orientation differences between the code patterns with respect to the reference orientation, and an order of the code patterns are determined according to a relative size of the code patterns.

Further, the code patterns may be formed with discriminative colors, and the identifiers may be determined as the colors of the code patterns, respectively. Specially, the design code pattern different characters or numerical values may be applied according to colors of the code patterns, and an order of the code patterns are determined according to a relative size of the code patterns.

There is provided a system for operating a design code pattern comprising a design code management server and a design code pattern generator connected to each other through a communication network, wherein the design code management server generates a matching code value corresponding to predetermined registration information received from the design code pattern generator, and transmits the generated matching code value to the design code pattern generator, and the design code pattern generator receives the matching code value corresponding to the registration information from the design code management server, and generates a design code pattern corresponding to the matching code value.

The design code management server may include: a matching code generator to generate the matching code value corresponding to the registration information received from the design code pattern generator; and a code information database to store the registration information and the matching code value corresponding to the registration information.

The system may further include a design code pattern recognizer connected to the design code management server through a communication network, wherein the design code pattern recognizer to recognize the design code pattern to extract the corresponding matching code value and to transmit the extracted matching code value to the design code management service to receive and display the registration information.

There is provided a design code management server connected to a design code pattern generator to generate a design code pattern through a communication network to receive predetermined registration information from the design code pattern generator, to generate a matching code value corresponding to the registration information, and to transmit the generated matching code value to the design code pattern generator. Further, the design code management server may further include a matching code generator to generate the matching code value corresponding to the registration information received from the design code pattern generator; and a code information database to store the registration information and the matching code value corresponding to the registration information. The design code management server maybe connected to a design code pattern recognizer to recognize a specific matching code value from the design code pattern to display corresponding registration information, receives the matching code value from the design code pattern recognizer and transmits registration information corresponding to the received matching code value to the design code pattern recognizer.

Advantageous Effects

When using the design code pattern according to the present invention, the user may optionally apply design elements to a code representing simple information. If the QR code or the bar code, etc. according to the related art obtained by encrypting numerical values or characters through a predetermined created rule is means for recognizing a target, the design code pattern according to the present invention can be interpreted as a specific symbol by applying a predetermined rule to a pattern with an aesthetic value.

Further, according to an operating system of the design code pattern according to the present invention, all information stored in a design code management server can be extracted according to information interpreted with the digital device.

BEST MODE

Mode of the Invention

Hereinafter, exemplary embodiments of the present invention are described with reference to the accompanying drawings in detail.

[Design Code Pattern]

The design code pattern according to this embodiment includes a plurality of code patterns having different sizes and identifiers formed at a predetermined region and represents a series of coded information by applying characters or numerals according to one of sizes and identifiers of the plurality of the code patterns and determining an order according to a remaining one. Here, for example, the code pattern may have a water drop shape, a leaf shape, a shell shape, a fruit shape, and a symbol pattern shape, etc. A subject of the code pattern is not specially limited if the subject has an aesthetic value in a patterned design. FIGS. 1 to 5 illustrate a water drop shape for illustration, and illustrate a case where the identifier is determined as an orientation of the code pattern and an order thereof is determined according to the size of the code pattern, and thereby a design code pattern according to the present invention is described.

Figure 1:
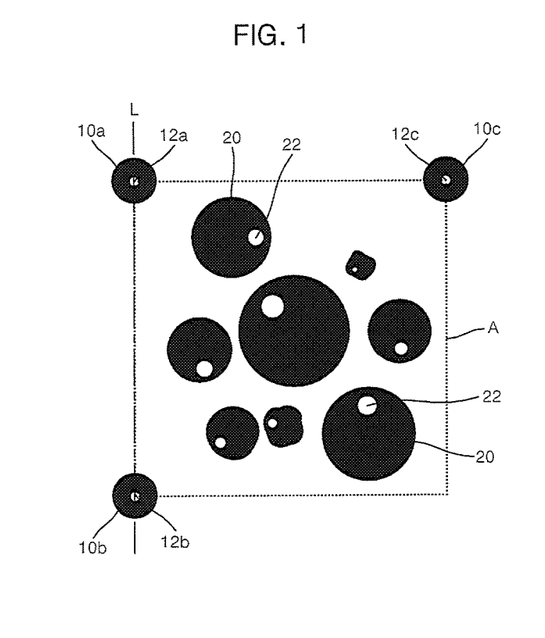
FIG. 1 is a diagram illustrating an example of implementing a real designed code using an embodiment of a design code pattern according to the present invention.

First, referring to FIG. 1, reference patterns 10a, 10b, and 10c define a recognition area A formed by a predetermined rectangular shape. For example, three reference patterns 10a, 10b, and 10c may be disposed, respectively, at three corners of a rectangular region to define the recognition area A. In particular, in the reference patterns 10a, 10b, and 10c special signals, for example, dots 12a, 12b, and 12c displayed at centers of water drop patterns may be formed, respectively, so that the reference pattern may be recognized. The recognition area A may be defined as a rectangular region for convenience, but a shape of the recognition area A is not limited thereto. Further, the reference patterns 10a, 10b, and 10c may define a specific reference orientation which will be described later as well as a range of the recognition area A. For example, in FIG. 1, a virtual line L connecting dots 12a and 12b formed in the center of the two reference patterns 10a, 10b may be defined as a reference orientation. Particularly, there are various methods to simultaneously define recognition area and the reference orientation through the reference patterns. For example, when a recognition area of the rectangular shape is defined, the reference patterns are formed only at three corners among four corners of the rectangular shape so that the reference orientation may be defined. In this manner, a reason to define the reference orientation through the reference pattern will be described in detail below.

Figure 2:
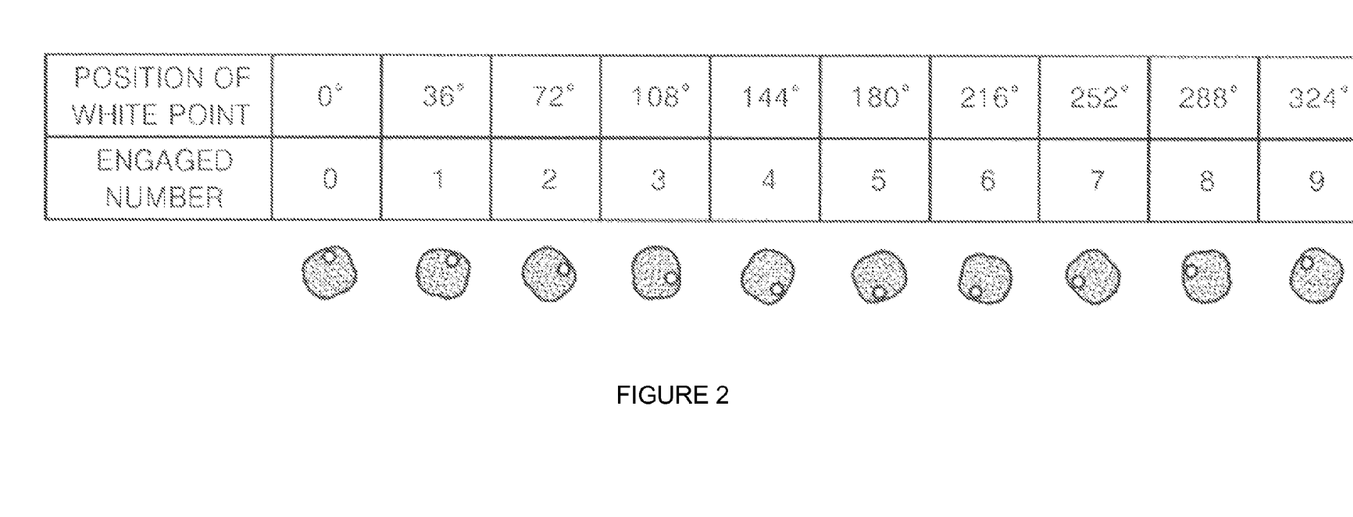
FIG. 2 is a diagram concretely illustrating a method of applying identification values of respective code patterns in a design code pattern according to the present invention.
Figure 3:
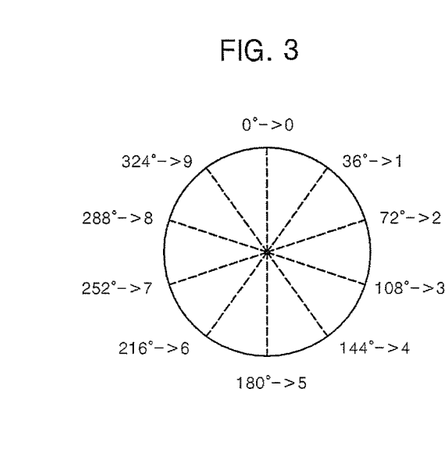
FIG. 3 is an exemplary diagram illustrating a method of actually representing information by a method of FIG. 2.
Figure 4:
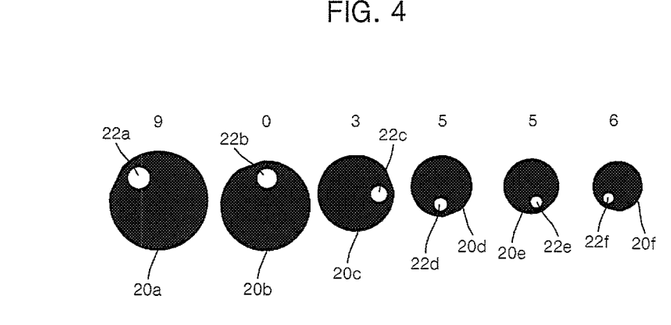
FIG. 4 is an exemplary diagram illustrating identification values applied to respective code patterns represented by a method of applying the identification values shown in FIGS. 2 and 3.
Figure 5:
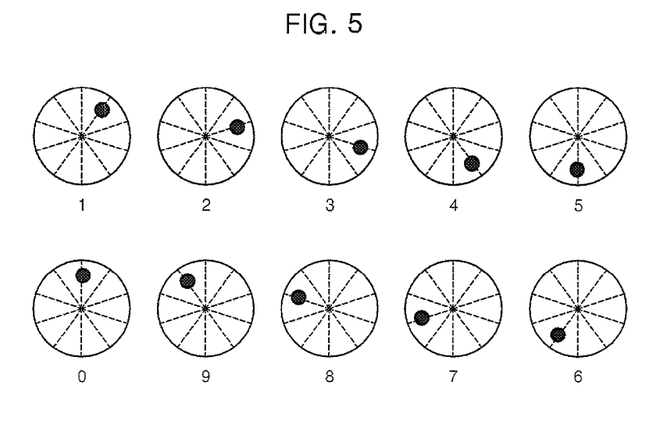
FIG. 5 is an exemplary diagram illustrating a method of representing information of respective code patterns constituting the design code pattern according to the present invention.

Next, a plurality of code patterns 20 are formed in the recognition area A defined by the reference pattern. A specific value is applied to the code patterns 20. FIGS. 1 to 5 illustrate a method of applying a value to the code patterns 20, for example, a method in which an indication for identifying an orientation (for example, dot 22) is formed around a circumference having a shape of an orientation, that is, a water drop shape. That is, as shown in FIGS. 2 and 3, when 360° is divided into 10 sections according to an orientation difference with respect to the reference orientation L, for example, when a dot 22 (displayed with a white point) is at "0"° with respect to a reference orientation L, a numeral "0" is applied to the dot 22. When the dot 22 is at "36"°, a numeral "1" is applied to the dot 22. In the same manner, the numeral value from "0" to "9" may be applied at an interval of 36°. For reference, FIGS. 4 and 5 illustrate code patterns having a water drop in which dots with respect to a specific number are formed, and thus it can be understood that the code patterns of a water drop shape according to this embodiment can be displayed by the decimal system.

Referring back to FIG. 1, a plurality of code patterns 20 are formed on the design code pattern according to the present invention on which the foregoing reference pattern and the code pattern are formed, and the code patterns 20 have specific numerical values 0 to 9. Further, the code patterns are formed in different sizes from each other (size of an area in which a code pattern occupies). The orders of the code patterns 20 having different sizes are determined according to the sizes. That is, in FIG. 1, a code pattern having the greatest area represents a number "9" and the number is located at a first position from a series of coded information. In addition, a code pattern having the smallest area represents a number "6" and is located at a final position from a series of coded information. Further, if there are at least two code patterns having the same size, the same identification value may be continuously disposed in this case. In this manner, if the design code patterns shown in FIG. 1 are interpreted, a series of number row of "90355686" may be read. In addition, an arrangement order of identification values of the code patterns may be set where a number of a code pattern having the smallest area is located at a first position, and a number of a code pattern having the largest area is located at a final position. In other words, a plurality of code patterns to each of which a numerical value is applied may be sequentially disposed according to a relative size (for example, a size of a formation area) at the design code pattern according to the present invention.

In this manner, the design code pattern according to the present invention may represent the same information regardless a code pattern occupies). The orders of the code patterns 20 having different sizes are determined according to the sizes. That is, in FIG. 1, a code pattern having the greatest area represents a number "9" and the number is located at a first position from a series of coded information. In addition, a code pattern having the smallest area represents a number "6" and is located at a final position from a series of coded information. Further, if there are at least two code patterns having the same size, the same identification value may be continuously disposed in this case. In this manner, if the design code patterns shown in FIG. 1 are interpreted, a series of number row of "90355686" may be read. In addition, an arrangement order of identification values of the code patterns may be set where a number of a code pattern having the smallest area is located at a first position, and a number of a code pattern having the largest area is located at a final position. In other words, a plurality of code patterns to each of which a numerical value is applied may be sequentially disposed according to a relative size (for example, a size of a formation area) at the design code pattern according to the present invention.

In this manner, the design code pattern according to the present invention may represent the same information regardless of a location of an individual code pattern formed in the recognition area A. Accordingly, if an orientation state and a relative size difference of code patterns to which a specific number is applied are determined, although the code patterns are randomly disposed in the recognition area A, the same coded information is expressed. Accordingly, since a freedom degree where the user may design the design code pattern is increased, the design code pattern according to the present invention may be used as a simple information recognition means and a design element in which an aesthetic value is improved. Further, since an arranged order of the numerical vales is determined according to a relative size of the respective code patterns, although reduction and enlargement occurs when the design code pattern is recognized as image information, the order value is not changed and the same information may be expressed.

Figure 6:
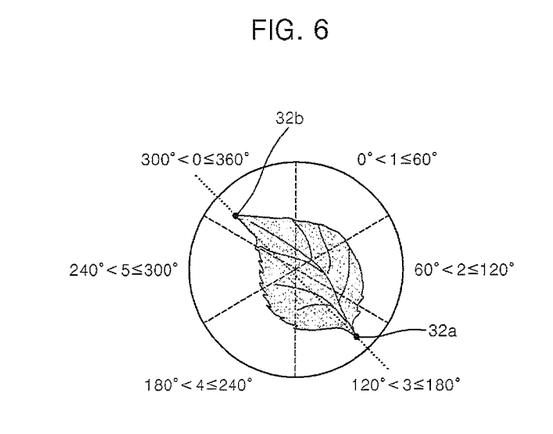
FIG. 6 is an exemplary diagram illustrating a scheme of applying an identification value to a code pattern having a leaf shape as another embodiment of the design code pattern of the present invention.
Figure 7:
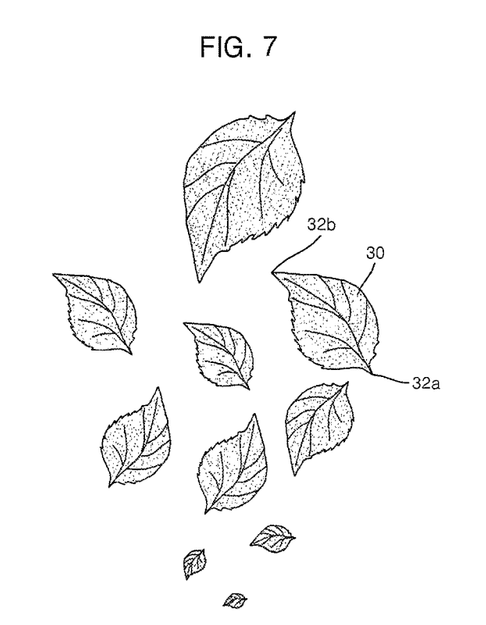
FIG. 7 is an exemplary diagram implementing a design code pattern using a code pattern having a leaf shape shown in FIG. 6.

In the design code pattern according to the present invention, the code pattern may have a leaf shape as shown in FIGS. 6 and 7. In the same as in the water drop pattern, orientation of the code pattern 30 may apply a numerical value to a direction to which a stem 32b of the leaf faces. For example, a numerical value may be applied according to an orientation difference between a virtual line formed along both ends 32a and 32b of the leaf and reference orientation. For reference, the code pattern 30 of a leaf shape shown in FIGS. 6 and 7 is expressed by a hexadecimal system. Here, the design code pattern having a leaf shape refers to a numerical row of "1344313212".

The number of patterns constituting design code patterns according to the present invention may apply a numeral system corresponding to the number of discriminative patterns. That is, a decimal system may use 10 discriminative patterns, and a quinary system may use five discriminative patterns. Since a few patterns become a simple design and so many patterns becomes complicated design, it is preferable to determine a suitable quantity in consideration of the aesthetic value. Further, the design code pattern using at least two different patterns may be formed and may variously configure a design by including a dummy pattern to which a numerical value is not applied.

Further, a value applied to the code pattern may designate a predetermined number or character. The character may include alphabets, specific characters or symbols. Different identification values may be applied according to an orientation difference from a reference orientation determined based on a reference pattern using a code pattern having a shape of orientation as in the foregoing embodiments. In addition to this method, after forming respective code patterns with a discriminative color (discriminate by brightness and saturation), different identification values may be applied according to the color difference. For example, the identification values may be applied according to the color difference in such a way that an identification value of "1" is applied to a yellow color, and an identification value of "2" is applied to a red color.

In particular, in the foregoing embodiments, a numerical value is applied according to an orientation of a code pattern, and a series of coded information is displayed in such a way that respective numerical values are arranged according to the size of the code pattern. However, on the contrary, a number or a character (or combination of numerals and characters) is applied according to the size of code patterns, and an order value may be designated according to the orientation. For example, in the code pattern having a water drop shape illustrated in FIGS. 1 to 5, a series of coded information may be expressed by sequentially designating the order value according to an angle difference from the reference orientation (designate the order value as a first position in the case of 0° and as a second position in the case of 36°). As a result, the design code pattern according to the present invention includes specific characters or numerical values necessary to express a series of coded information in an individual code pattern itself, and an order value representing orders that respective characters or numbers are arranged. Accordingly, the user may control positions of code patterns formed in a recognition region, and thereby may variously design the code patterns.

Meanwhile, the identification values such as number, character, blank, reference symbol, etc. may be applied to the design code pattern according to the present invention so that a series of information is expressed. The design code pattern according to the present invention may be operated to display various information by constructing a system for operating a design code pattern through a communication network. In this regard, details will be explained through the following embodiments below.

[System for Operating a Design Code Pattern]

A system for operating a design code pattern according to the present invention will be described with reference to FIGS. 8 to 11.

Figure 8:
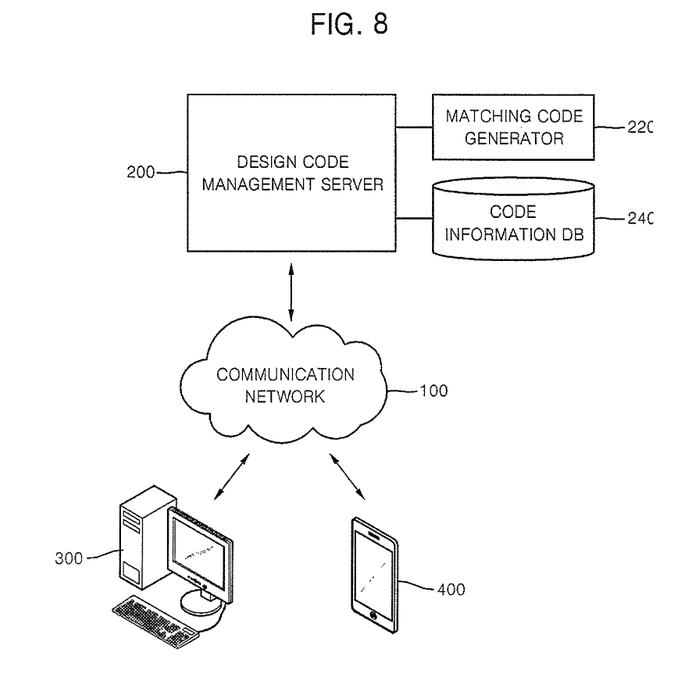
FIG. 8 is a schematic diagram illustrating a system to operate a design code pattern according to the present invention.

Referring to FIG. 8, the system for operating a design code pattern according to the present invention may include a design code management server 200 and a design code pattern generator 300 connected to each other through a communication network 100. Moreover, a design code pattern recognizer 400 may be connected to the design code management server 200 through the communication network 100. Here, the communication network 100 may use a wired computer network, a wireless computer network, a telephone line, a satellite line, and Internet.

Figure 11:
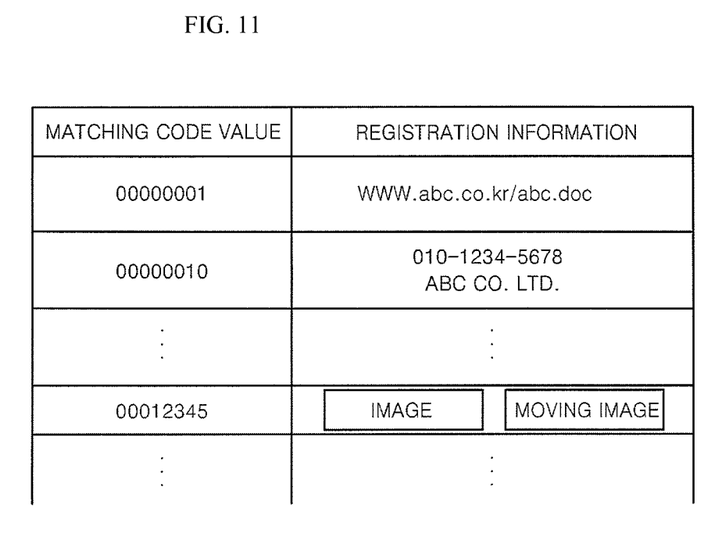
FIG. 11 is an exemplary diagram illustrating a structure of a code information database included in a design code management server in the system for operating a design code pattern according to the present invention.

The design code management server 200 generates a matching code value corresponding to a predetermined registration information received from the design code pattern generator 300, and transmits the generated matching code value to the design code pattern generator 300. The design code management server 200 may include a matching code generator 220 to generate a matching code value corresponding to registration information received from the design code pattern generator 300, and may include a code information database 240 to store the registration information and a matching code value corresponding thereto. For reference, FIG. 11 illustrates an example of storing a matching code value recorded in the code information database 240 and registration information corresponding thereto.

Further, the design code pattern generator 300 receives a matching code value corresponding to a predetermined registration information from the design code management server 200, and generates a design code pattern corresponding to the matching code value. The design code pattern recognizer 400 recognizes an optional design code pattern to extract a corresponding matching code value, and transmits the extracted matching code value to the design code management server 200 so that the design code management server 200 receives and displays corresponding registration information. A method of generating a design code pattern by the design code pattern generator 300 and a method of recognizing a specific matching code value from the design code pattern by the a design code pattern recognizer 400 will be described below in detail.

—Method of Generating a Design Code Pattern—

The design code pattern generator 300 may use a personal computer, and a portable terminal, and a person (hereinafter, referred to as 'user') who wish to generate the design code pattern first writes registration information in the design code pattern generator. The registration information may register all types of information such as moving images, photographs, messages, phone numbers, name card information, web site address (URL address), SNS address, etc. The user inputs the registration information (S110 of FIG. 9), and then requests issue of a matching code to the design code management server 200 (S120). According to the request of issue of the matching code from the design code pattern generator 300, the design code management server 200 generates a matching code value corresponding to the received registration information and transmits the matching code value to the design code pattern generator 300. In this case, the registration information of the user is stored in the URL of the server prepared by the manager and a value (matching code value) symbolized by simple numbers or characters is matched with the URL prepared by the manager. It is preferable to randomly generate the matching code value by the design code management server 200 instead of selecting the matching code value by the user in order to obtain creativity of the design code pattern.

Figure 9:
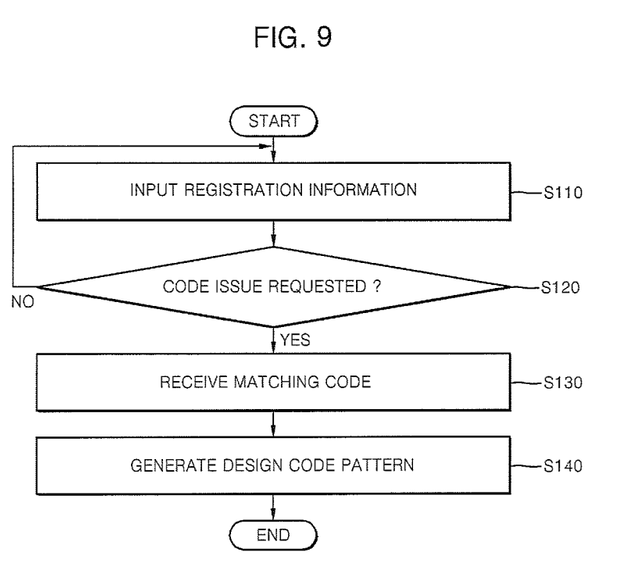
FIG. 9 is a flowchart illustrating a method of generating a design code pattern in a system for operating a design code pattern according to the present invention.

Next, the user forms a design code pattern with a desired design based on the matching code value received from the design code management server 200 (S140). In this case, the orientation or color of code patterns having a predetermined shape are determined and a relative size of a plurality of code patterns according to the matching code value is determined so that the design code pattern have respective values or colors constituting a matching code value. That is, the relative size of respective code patterns is determined together with the orientation or colors of the individual code patterns to be arranged in a recognition range determined according to reference patterns. Accordingly, a plurality of code patterns having symbolized information (matching code value) are generated. The design code pattern according to the present invention expresses the same information by determining the relative size together with the orientation or colors of the plurality of code patterns and positions of the code patterns may be optionally adjusted by the user. Accordingly, the user cancels the firstly generated a design which the user does not want to regenerate the design by using a design code pattern generator 300. Since the position of the individual code patterns is not related to information which design code pattern has, a position of the generated design may be changed through a 'shake' function, and a position of the individual pattern may be designated one by one. In addition, the user may optionally configure a design by adding a dummy pattern in which a specific value is not designated. Accordingly, a design code pattern providing various aesthetic values may be generated.

If the design code pattern capable of being induced to information provided from the user is completed, the user may transmit the design code pattern to other persons through an online or use it as a desired use, and may apply the design code pattern to a fashion product such as clothes, etc. and may utilize it as an identification code expressing as a desired information.

—Method of Recognizing Design Code Pattern—

The design code pattern recognizer 400 may use a portable terminal, and may install and use an application program necessary for a smart phone and the like. In particular, the design code pattern recognizer 400 may include an image information acquiring unit such as a camera and scanner, etc. to acquire image information on a preformed design code pattern, a matching code value extractor to recognize and extract an expressed matching code value from the image information on the design code pattern, and a code information display unit to transmit the extracted matching code value to the design code management server 200 and to receive and display corresponding registration information.

Figure 10:
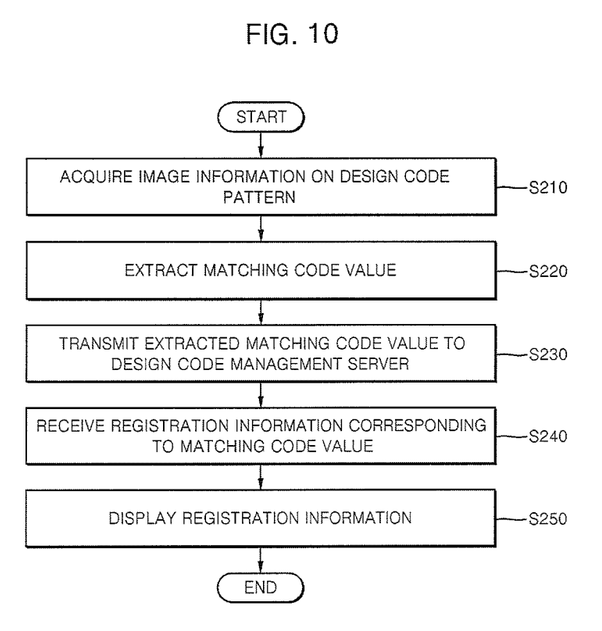
FIG. 10 is a flowchart illustrating a method of identifying the design code pattern in the system for operating a design code pattern according to the present invention.

A method of recognizing the design code pattern by the design code pattern recognizer 400 will be described with reference to FIG. 10. First, the design code pattern recognizer 400 acquires image information on a design code pattern from an expression medium (for example, analog media such as newspapers, advertisement leaflets, and posters and digital media such as television screen and monitor screen, etc.) (S210).

Next, the design code pattern recognizer 400 recognizes a reference pattern formed at the design code pattern to determine a recognition range, and recognizes a plurality of code patterns formed in the recognition range to determine an order of a character or number applied to the respective code patterns, thereby extracts matching code value expressed on the design code pattern (S220).

Next, the design code pattern recognizer 400 transmits the extracted matching code value to the design code management server 200 (S230), and receives registration information corresponding to a matching code value from the design code management server 200 (S240). In this case, various types of registration information are recorded in a code information database 240 of the design code management server 200, and the design code pattern recognizer 400 may display the various types of registration information through a code information display unit (S250). Particularly, when specific URL information is included as registration information, the design code pattern recognizer 400 may display a web page indicating a corresponding URL.

[Industrial Applicability]

Upon using the design code pattern according to the present invention, the user can optionally apply a design element to a code expressing simple information. If a QR code or a bar code encrypting number or characters through an established creation rule is a means for recognizing a target, a design code pattern according to the present invention can be interpreted as a specific symbol by applying a pattern having the aesthetic value.

In addition, according to the system for operating a design code pattern according to the present invention, some information stored in the design code management server may be extracted according to information integrated by the digital device.

Although embodiments have been described with reference to a number of illustrative embodiments thereof, it should be understood that numerous other modifications and embodiments can be devised by those skilled in the art. Therefore, the real technical protection scope of the present invention needs to be from the technical spirit and equivalent scopes of the appended claims of the present invention.

The invention claimed is:

1. A design code pattern comprising a plurality of code patterns formed in a predetermined region and in which identifiers are formed, respectively, wherein the plurality of code patterns have sizes different from each other, and characters or numbers are applied according to one of the sizes and the identifiers of the code patterns and an order of the code patterns is determined according to a remaining one of the sizes and the identifiers to express a series of coded information.

2. The design code pattern of claim 1, further comprising a reference pattern to define a recognition region in which the code patterns are formed.

3. The design code pattern of claim 1, further comprising a reference pattern to define reference orientation, wherein the code patterns have a shape with the orientation, and the identifiers are determined according to orientation differences of the code patterns with respect to the reference orientation.

4. The design code pattern of claim 3, wherein different characters or numbers are applied according to respective orientation differences between the code patterns with respect to the reference orientation, and an order of the code patterns are determined according to a relative size of the code patterns.

5. The design code pattern of claim 1, wherein the code patterns are formed with discriminative colors, and the identifiers are determined as respective colors of the code patterns.

6. The design code pattern of claim 5, wherein different characters or numbers are applied according to respective colors of the code patterns, and an order of the code patterns are determined according to a relative size of the code patterns, 7. A system for operating a design code pattern comprising a design code management server and a design code pattern generator connected to each other through a communication network, wherein the design code management server generates a matching code value corresponding to a predetermined registration information received from the design code pattern generator, and transmits the generated matching code value to the design code pattern generator, and the design code pattern generator receives the matching code value corresponding to the registration information from the design code management server, and generates a design code pattern corresponding to the matching code value, wherein
the design code pattern includes a plurality of code patterns formed in a predetermined region and in which identifiers are formed, respectively, wherein the plurality of code patterns have sizes different from each other, and characters or numbers are applied according to one of the sizes and the identifiers of the code patterns and an order of the code patterns is determined according to a remaining one of the sizes and the identifiers to express a series of coded information.

8. The system of claim 7, wherein the design code management server comprises:
a matching code generator to generate the matching code value corresponding to the registration information received from the design code pattern generator; and a code information database to store the registration information and the matching code value corresponding to the registration information.

9. The system of claim 7, further comprising a design code pattern recognizer connected to the design code management server through a communication network, wherein the design code pattern recognizer to recognize the design code pattern to extract the corresponding matching code value and to transmit the extracted matching code value to the design code management service in order to receive and display the registration information.

10. A design code management server connected to a design code pattern generator to generate a design code pattern through a communication network to receive a predetermined registration information from the design code pattern generator, to generate a matching code value corresponding to the registration information, and to transmit the generated matching code value to the design code pattern generator, wherein
the design code pattern includes a plurality of code patterns formed in a predetermined region and in which identifiers are formed, respectively, wherein the plurality of code patterns have sizes different from each other, and characters or numbers are applied according to one of the sizes and the identifiers of the code patterns and an order of the code patterns is determined according to a remaining one of the sizes and the identifiers to express a series of coded information.

11. The design code management server of claim 10, further comprising: a matching code generating unit to generate the matching code value corresponding to the registration information received from the design code pattern generator; and a code information database to store the registration information and the matching code value corresponding to the registration information.

12. The design code management server of claim 10, wherein the design code management server is connected to a design code pattern recognizer to recognize a specific matching code value from the design code pattern to display corresponding registration information, receives the matching code value from the design code pattern recognizer and transmits registration information corresponding to the received matching code value to the design code pattern recognizer.

* * * * *